June 17, 1969     J. E. HEWSON     3,450,157
VALVE MANIFOLD
Filed July 31, 1967     Sheet 1 of 2
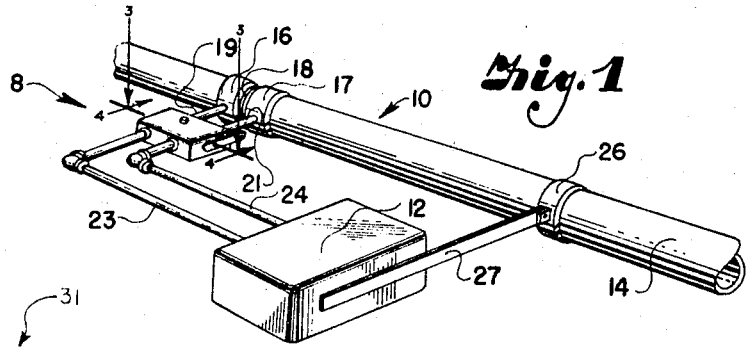
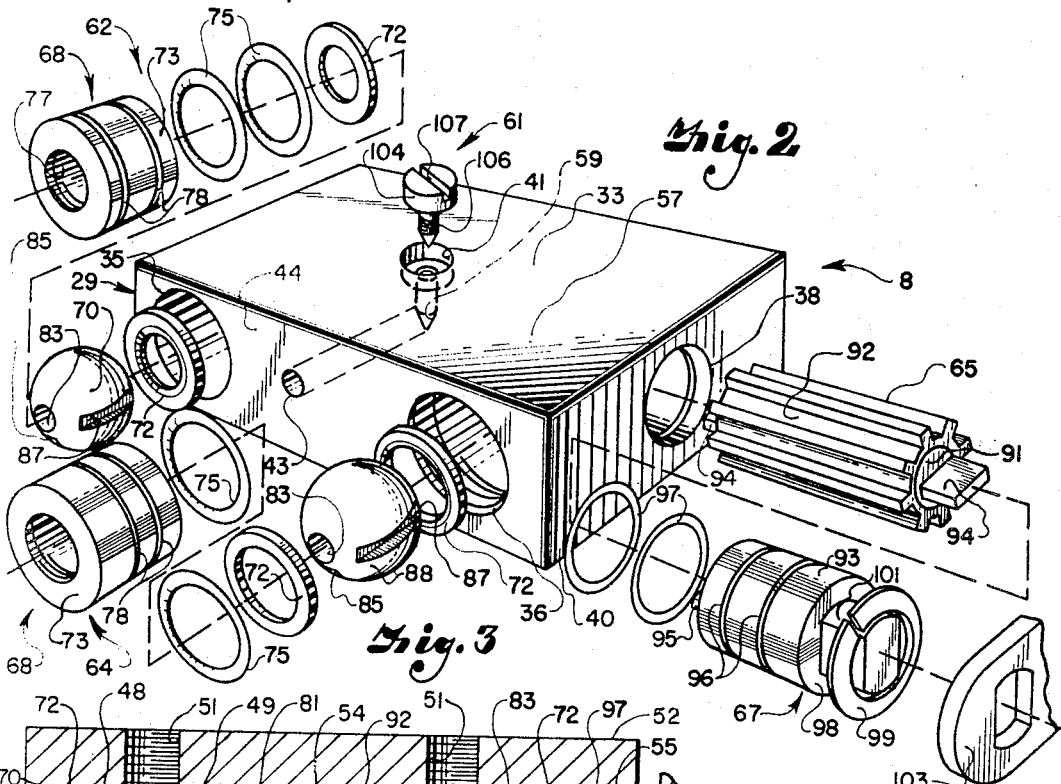
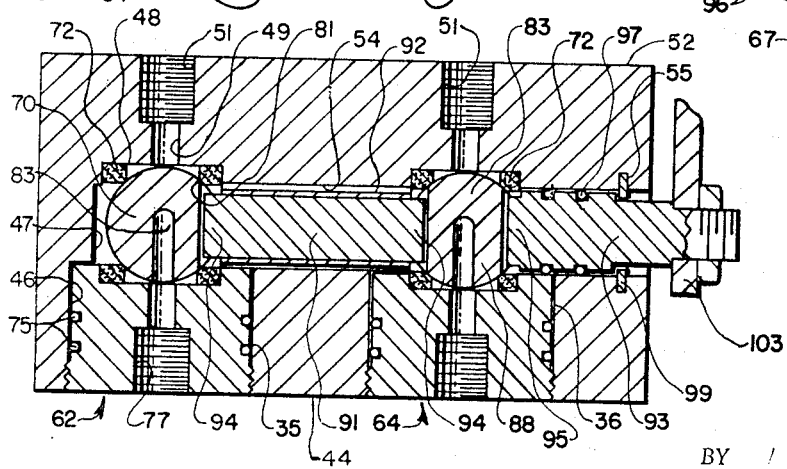
INVENTOR.
JOHN E. HEWSON
BY
ATTORNEYS

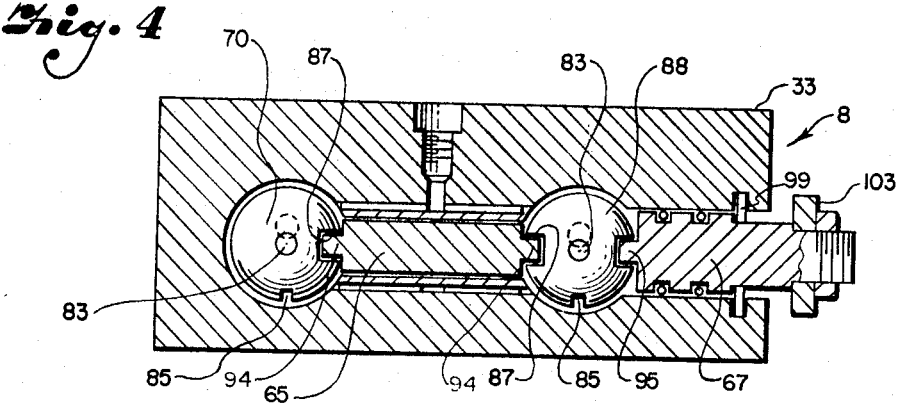
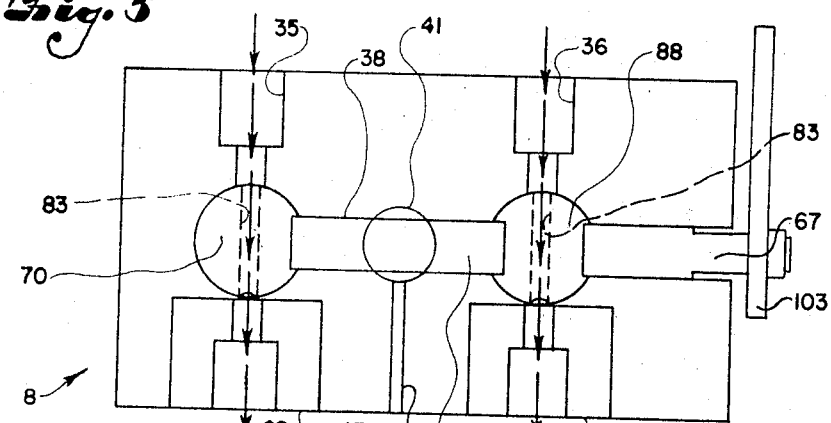
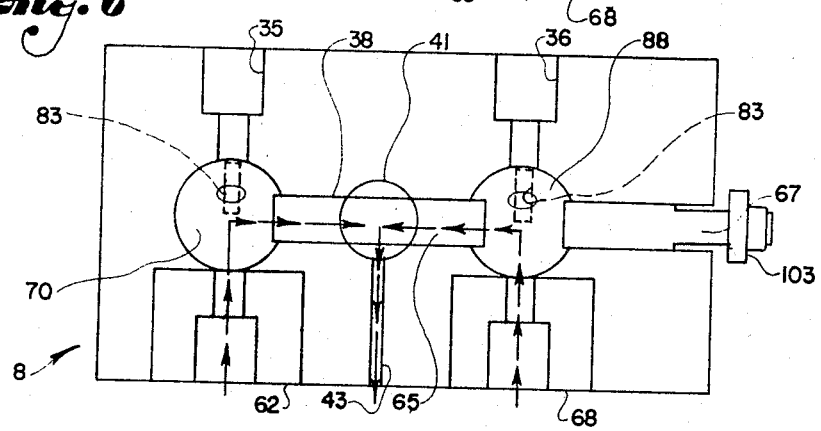

United States Patent Office 3,450,157
Patented June 17, 1969

3,450,157
VALVE MANIFOLD
John E. Hewson, 12211 Broken Arrow,
Houston, Tex. 77024
Filed July 31, 1967, Ser. No. 657,346
Int. Cl. E03b; E03c; F17d
U.S. Cl. 137—595
10 Claims

ABSTRACT OF THE DISCLOSURE

This invention relates to valving means used in fluid conveyance systems to assist in measuring conditions of operation through a differential pressure meter, transmitter, or the like, and more particularly, this invention relates to a valve manifold placed between a fluid flow line and a differential pressure measurement instrument to selectively control fluid thereto. Still, more specifically, this invention relates to a valve manifold including a pair of rotatable ball valve assemblies having spherical ball valve members conjointly rotatable to regulate direction of fluid flow by partial ball valve rotation.

---

Numerous types of valve structures are known to the prior art usable in fluid piping systems to control and regulate the fluid to a differential pressure meter, transmitter or the like for measurement of fluid pressure within a fluid flow pipe line. The use of differential pressure transmitters to transmit pressure differential from pressure taps in a fluid conveyance system are well known to the art as are the means to establish the pressure differential, such as a flow nozzle, orifice plate, venturi tube, and the like. These differential pressure transmitters are normally remotely located from the flow meter or flow controller, being installed at or near the orifice plate or venturi tube in the fluid flow pipe line. The fluid flowing in the pipe line is in pressure communication with a conventional differential pressure transmitter through conduits from orifice pressure taps in the line. In order to be able to check the differential pressure transmitter or flow meter, a by-pass line with a valve therein is usually connected between the conduits from the orifice pressure taps and the transmitter so that the pressure in both conduits to the transmitter can be made equal to see if the transmitter and/or the remote meter indicates zero pressure differential. Additionally, numerous valves are normally installed in these conduits so that the differential pressure measuring device can be isolated for these lines for repair and maintenance. Therefore, it is seen that the usual piping and valving means in order to achieve the interconnection and venting of a fluid flow to a differential pressure transmitter or meter is difficult, expensive, and very time consuming to install plus compact positioning of the fluid flow transmitter as required is difficult. The close or compact coupling of the fluid flow transmitter is very difficult if not impossible in the prior art devices. The prior art piping systems are constructed of numerous pipe nipples, valves, T's, etc. and provide a great number of potential leak points and take up a large amount of room in the piping "alley ways." Additionally, it difficult to steam trace these systems to prevent freezing in cold weather, and it is difficult, time consuming, and expensive to clean out the system when choking, liming, etc. occurs or when it is desired to purge the system with cleaning fluid or the like. One prior art device which overcomes many of these aforementioned disadvantages is that of the applicant's invention entitled "Valve Manifold," filed Jan. 28, 1957, and issued as Patent No. 2,871,881. It is seen, therefore, that the prior art devices are expensive to assemble and require a plurality of valve members in order to direct and isolate the fluid flow passageways as required in an efficient differential pressure measuring system.

In a preferred specific embodiment of the valve manifold of this invention, the valve manifold is adapted to be mounted in a fluid conveyance system having a pipe line with orifice flanges mounted on opposite sides of an orifice plate member or the like operable to convey differential fluid pressure by conduits to the valve manifold from respective sides of the orifice plate member. In turn, the valve manifold is interconnected as by a pair of pipe members to a differential pressure measuring device which is operable to produce a signal indicative of the differential fluid pressure in the pipe line of the fluid conveyance system. The valve manifold includes a main manifold body having a pair of first and second like, spaced parallel passageways therethrough and a third passageway extended transversely of the first and second passageways having one end open externally of the manifold body. The third passageway is intercepted by a vent passageway which, in turn, is connected to an opening extended transversely of the manifold body to release pressure fluid therefrom as required. Each of the first and second passageways are provided with an enlarged central cavity adapted to receive a ball valve assembly therein having a spherical ball valve member with valve seat members mounted thereabout. Each ball valve assembly is held within the first and second passageways, respectively, by a closure plug threaded therein having a central threaded opening connected as by one of the pipe members to the differential pressure measuring device. Each ball valve member has a diametrically extended opening therethrough providing for unrestricted fluid flow through the first and second passageways, respectively, in one rotational position and a chordally extended slot used in a second position to by-pass fluid as will be explained. Additionally, the facing sides of the ball valve members are provided with connector slots chordally extended adapted to receive an elongated linkage stem member therein mounted in the third passageway for conjoint rotation of the ball valve members. The linkage stem member is provided with an outer splined surface to allow pressure fluid within the third passageway to flow into the vent passageway. The ball valve member near the open end of the third passageway is provided with another diametrically opposed connector slot adapted to receive one end of a valve stem assembly mounted within the outer threaded end of the third passageway. The valve stem assembly is provided with an outwardly extended lug portion to which is connected a handle member for partial conjoint rotation of the interconnected ball valve member, linkage stem member, and valve stem assembly. A needle valve member is threadedly mounted within the vent passageway and having a lower pointed portion engageable within an inclined seat section intersecting the by-pass opening and the third passageway to selectively release fluid flow through the by-pass opening or seal the same by rotation of the needle valve member. Therefore, it is noted that the handle member is rotatable to align the fluid flow openings in the ball valve members with the first and second passageways in one position whereas rotation 90 degrees therefrom acts to seal the fluid flow openings by the ball valve members but allows fluid pressure to pass into the third passageway about the linkage stem member. The splines on the linkage stem member permits fluid flow to the vent passageway whereupon the needle valve member can be opened or closed to permit fluid flow and release fluid pressure through the by-pass opening as desired. The valve manifold of this invention achieves the same functions of applicant's aforementioned patent (2,871,-881) with a minimum of valves, only one packing gland, fewer possible leak points and a practically impossible "valve sticking" capability.

Accordingly, it is an object of this invention to provide a new and novel valve manifold overcoming the above-mentioned disadvantages of the prior art devices.

Another object of this invention is to provide a compact, highly efficient valve manifold mounted in limited space area having a single handle member partially rotatable to control fluid flow therethrough.

A further object of this invention is to provide a valve manifold connectible between a differential pressure transmitter, or measurement means and a pipe line having fluid pressure therein to be measured, the valve manifold having a main body with parallel fluid passageways with ball valve assemblies mounted therein rotatable from open to by-pass positions.

One other object of this invention is to provide a valve manifold having a pair of spherical ball valve members rotatable from first unrestricted fluid flow positions to second by-pass positions and the ball valve members are interconnected for conjoint rotational movement.

Still, another object of this invention is to provide a valve manifold having spherical ball members interconnected by a linkage stem for substantially conjoint but lagging rotational movement to pressurize both sides of a meter chamber with the high pressure for an instant prior to rotation to the fully opened position for greater meter accuracy.

One further object of this invention is to provide a valve manifold that is easy to install and use, economical to manufacture, readily disassembled for repair and maintenance, and reliable in operation.

Various other objects, advantages, and features of the invention will become apparent to those skilled in the art from the following discussion, taken in conjunction with the accompanying drawings, in which:

FIG. 1 is a perspective view of a valve manifold of this invention connected between a fluid conveyance system and a measurement instrument;

FIG. 2 is an exploded perspective view of the valve manifold of this invention;

FIG. 3 is an enlarged sectional view of the valve manifold of this invention taken along line 3—3 in FIG. 1;

FIG. 4 is an enlarged sectional view of the valve manifold of this invention taken along line 4—4 in FIG. 1; and FIGS. 5 and 6 are schematic diagrams illustrating the various conditions of fluid flow in the valve manifold of this invention.

The following is a discussion and description of the preferred specific embodiments of the new valve manifold of this invention, such being made with reference to the drawings, whereupon the same reference numerals are used to indicate the same or similar parts and/or structure. It is to be understood that such discussion and description is not to unduly limit the scope of the invention.

Referring to the drawings in detail, and in particular to FIG. 1, the valve manifold of this invention, indicated generally at 8, is illustrated as mounted between a fluid conveyance system 10 and a measuring instrument 12. More specifically, the fluid conveyance system 10 includes a pipe line member 14 having a pair of orifice flanges 16 and 17 secured thereto with an orifice plate 18 mounted therebetween. The orifice flanges 16 and 17 are connected as by conduits 19 and 21, respectively, to the valve manifold 8 which, in turn, is connected by pipe members 23 and 24 to the measuring instrument 12. A mounting bracket 26 is secured to the pipe line member 14 and to a support bar 27 connected to the measuring instrument 12 to anchor same in a desired location.

Although the orifice plate 18 is used in this fluid conveyance system 10 having an opening therein to create pressure differential relative one side to the other, it is noted that a venturi tube, flow nozzle, or the like could be used in the system to create a pressure differential. Additionally, the measuring instrument 12 is generally of a differential pressure transmitter type used to send a signal to a remote gauge or meter but various embodiments of instruments could be used operable to isolate and compare fluid pressures in the fluid conveyance system 10.

As shown in FIG. 2, the valve manifold 8 includes a housing means 29 having a fluid control means 31 mounted therein. The housing means 29 includes a manifold body 33 of rectangular block shape having a pair of like, spaced parallel first and second passageways 35 and 36 therethrough; a third intermediate passageway 38 extended transversely of the first and second passageways 35 and 36 having one open end that is extended through an end wall 40 of the manifold body 33; a bleed passageway 41 interconnected to the third passageway 38; and a vent channel or opening 43 interconnected to the third passageway 38 and the bleed passageway 41 to permit controlled bleeding of fluid pressure from within the manifold housing means 29 as will be explained.

As the first and second passageways 35 and 36, respectively, are substantially identical, only the first passageway 35 need be described in detail. As shown in FIGS. 3 and 4, the first passageway 35 is constructed successively from a sidewall 44 of the manifold body 33 with an enlarged opening 46 having outer threads; a cylindrical mid-section 47; a stepped cylindrical valve seat opening 48; an interconnecting channel 49; and finally, a threaded opening 51 extended out to an opposite sidewall 52 to which the conduit 19 is connected. The second passageway 36 is substantially identical except the mid-section 47 has been eliminated by the machining operation of the third passageway 38 during manufacture thereof.

The third passageway 38 consists of elongated bore 54 extended into the mid-section 47 of the first passageway 35 having the axes of the first and second passageways 35 and 36 and the third passageway 38 intersecting. The open end of the bore 54 is formed with a radially extended circumferential groove 55 adapted to receive a retaining ring therein as will be explained. The upper open end of the bleed passageway 41 extends transversely of a top surface 57 of the manifold body 33 with the lower portion tapered inwardly of conical shape to form a seat portion 59 intersecting the third passageway 38. The bleed passageway 41 is provided with threads adapted to receive a vent valve member 61 therein as will be explained. As shown in FIG. 2, the elongated vent opening 43 extends between and parallel to the first and second passageways 35 and 36 and intercepts the seat portion 59 of the bleed passageway 41.

The fluid control means 31 includes a pair of substantially identical ball valve assemblies 62 and 64 mountable within the first and second passageways 35 and 36, respectively, and interconnected to each other as by an elongated linkage stem member 65. Additionally, a valve stem assembly 67 is mounted in the open end of the third passageway 38 and interconnected to the ball valve assembly 64 for the conjoint rotation of both the ball valve assemblies 62 and 64. The vent valve member 61 is mountable within the bleed passageway 41 to control bleeding of fluid pressure as will be explained.

The ball valve assembly 62 includes a closure plug assembly 68 adapted to fit within the threaded opening 46 of the first passageway 35 to retain a spherical ball member 70 and adjacent valve seat members 72 therein. The closure plug assembly 68 includes a main closure member 73 having a pair of O-ring members 75 connectible thereto. The closure member 73 is of a cylindrical shape having external threads engageable with the threaded opening 46 of the first passageway 35 and having a central channel 77 therethrough formed with internal threads connectible in a conventional manner to the pipe member 23. The inner outer surface of the closure member 73 is provided with a pair of spaced circumferential grooves 78 each adapted to receive an O-ring member 75 for sealing engagement with the sidewall of the enlarged opening 46.

As shown in FIG. 3, the valve seat members 72 are of square shape in transverse cross section except having an inner curved sealing surface 81 adapted to contact the spherical ball member 70 in assembly as will be explained. The spherical ball member 70 is provided with an axially extended fluid flow opening 83 therethrough; a chordally extended by-pass slot 85 inclined relative the fluid flow opening 83 and a connector slot 87 extended substantially parallel but rotated 90 degrees relative to the by-pass slot 85. The ball valve assembly 64 is substantially identical to the above-described ball valve assembly 62 except that a spherical ball member 88 is used having the fluid flow opening 83 and the by-pass slot 85 plus a pair of parallel and diametrically opposed connector slots 87 to provide for interconnection of the spherical ball members 70 and 88.

As shown in FIG. 2, the linkage stem member 65 is preferably constructed of a central cylindrical main body 91 having a splined sleeve member 92 mounted thereon. The main body 91 is provided with laterally extended connector bars 94 on opposite ends thereof to form a slot and key connection with the connector slots 87 on the spherical ball members 70 and 88, respectively as will be explained. The outer splined sleeve member 92 is mounted on the main body 91 and may or may not be rotatable therewith and is preferably constructed of a plastic material or the like to prevent corrosion and resultant sticking in the third passageway 38. This is especially essential when a corrosive type fluid is carried in the fluid conveyance system 10.

The valve stem assembly 67 includes a main connector body 93 having an inwardly projecting lug member 95 engagable with the outer connector slot 87 of the spherical ball member 88; a pair of circumferentially extended outer grooves 96 each adapted to receive an O-ring member 97; an inwardly extended flange portion 98 adapted to receive a retaining ring 99 thereagainst; and an outwardly extended threaded end portion 101 adapted to receive a handle member 103 thereon. It is seen that the valve stem body 93 is of a diameter slightly smaller than that of the third passageway 38 mountable in conjunction with the O-ring members 97 to provide sealing engagement with the inner surface of the third passageway 38. The handle member 103 may be threaded upon the outer end portion 101 and locked in a given position as by a set screw (not shown) or may be provided with splined or key-way connection to the handle member 103 which is of the lever type normally rotatable 180 degrees or less to open or close a valve structure. A positive stop may be added to the handle member 103 to clearly ascertain open and closed positions.

As best shown in FIG. 2, the vent valve member 61 is of a plug shape having an upper externally threaded main portion 104 and an integral downwardly extended needle section 106 of conical shape for sealing engagement with the seat portion 59 of the vent passageway 41. The upper end of the threaded main portion 104 is provided with a slot 107 thereacross for ease of rotation of the vent valve member 61 as by a screw-driver in the vent passageway 41.

In the assembly of the valve manifold 8 of this invention, one of the valve seat members 72 is mounted within the first passageway 35 against the flange portion of the opening 48 whereupon the spherical ball member 70 can be mounted therein and the other valve seat member 72 is placed against the outer surface thereof. The closure member 73 having the O-ring members 79 thereon is threaded within the outer enlarged opening 46 so as to apply pressure and seal the valve seat members 72 against the spherical ball member 70. The spherical ball member 70 is rotated so as to place the axes of the connector slot 87 perpendicular to the third passageway 38 whereupon the linkage stem member 65 is mounted through the third passageway 38 and the innermost connector bar 94 is mounted within the slot 87 to provide a slot and key connection.

Next, the ball valve assembly 64 is mounted within the second passageway 36 by first inserting, successively, one valve seat member 72, the spherical ball member 88, and the other valve seat member 72. The connector slot 87 on the spherical ball member 88 is extended over the other connector bar 94 on the linkage stem member 65. Thereupon, the closure member 73 of the ball valve assembly 64 is threadably mounted within the enlarged opening 46 of the second passageway 36 to provide a fluid seal. Finally, the valve stem assembly 67 is connected thereto by inserting the main body 93 within the third passageway 38 so that lug member 95 is placed within the other connector slot 87 on the spherical ball member 88. The retaining ring 99 is thereupon placed against the flange portion 98 of the main body 93 within the retainer groove 55 of the manifold body 33 in a conventional manner to prevent outward axial movement of the main body 93. The control handle member 103 is mounted upon the end portion 101 whereby rotation of the handle member 103 operates to rotate the valve stem assembly 67, interconnected spherical ball members 70 and 88, and linkage stem member 65. It is obvious that the assembled valve manifold 8 can be readily connected to the conduits 19 and 21 and the pipe members 23 and 24 in a conventional manner, as shown in FIG. 1, to control fluid flow through the first and second passageways 35 and 36. Additionally, it is noted that the vent valve member 61 can be readily rotated within the bleed passageway 41 in a conventional manner and, if threaded to the extreme downward position, would form a seal with the seat portion 59 to prevent fluid flow outwardly of the vent opening 43.

In the use and operation of the valve manifold 8 of this invention, the same is mounted in the fluid conveyance system 10 as shown in FIG. 1 and the control handle member 103 is rotatable to the open position (FIG. 5) whereupon the openings 83 in the spherical ball members 70 and 88 are aligned with the first and second passageways 35 and 36, respectively, to allow unrestricted fluid flow from the conduits 19 and 21 to the pipe members 23 and 24, respectively. In this position the by-pass slots 85 on the ball members 70 and 88 are closed by the valve seat members 72 to the fluid flow within the first and second passageways 35 and 36.

On rotation of the handle member 103 substantially 90 degrees, the interconnection of the valve stem assembly 67, spherical ball members 70 and 88, and the linkage stem member 65 operates to rotate the fluid flow openings 83 into a sealed or closed position relative to the first and second passageways 35 and 36. However, the by-pass slots 85 are movable so as to be open to the pipe members 23 and 24 thereby allowing fluid flow into the third passageway 38 about the linkage stem member 65 due to the splined sleeve member 92. If the vent valve member 61 is in the sealed or closed condition, the pressure fluid will flow between the pipe members 23 and 24 thereby providing an equalization of pressure within the measurement instrument 12 which is desirable under certain measuring conditions. However, the measuring instrument 12 may be released of all pressure thereon by rotating the vent valve member 61 to raise the needle section 106 from the seat portion 59 of the bleed passageway 41 thereby permitting fluid to flow from the first and second passageways 35 and 36 through the third passageway 38 and outwardly through the bent opening 43 thereby releasing pressure from the measuring instrument 12 which is desirable in certain adjustment and checking conditions.

The valve manifold 8 is constructed with loose key slot connections between the connector slots 87 on the ball members 70 and 88 and the connector bars 94 plus the connection of the lug member 95 with the slot 87 on ball member 88. Therefore, on rotation of the valve stem assembly 67, the pre-determined loose connections causes rotation of the first or near ball member 88 prior to rotation of the other ball member 70. On connection of the valve manifold 8 to the piping system 10, the initially rotatable ball members 88 is connected to the high pressure side of the orifice plate 18. On initial operation of the valve manifold 8, rotation of the valve stem assembly 67 from the closed condition first permits high pressure fluid to flow from conduit 21 through by-pass slot 85 and about linkage stem member 65 so as to be present in pipe members 23 and 24 on both sides of a metering chamber in the instrument 12. This is called "loading" of the measuring device and is accomplished by the valve manifold 8 of this invention by a simple partial rotation of the handle member 105. After equalization of pressure in the instrument 12, further rotation of the valve stem assembly 67 opens the passageways 35 and 36 to normal low and high pressure conveyance, respectively.

The construction of the valve manifold 8 in having the passageways 35, 36 and 38 straight through and intersecting provides for the ready cleaning or "rod-out" feature. This is extremely important in conveyance of impure or corrosive fluids. Additionally, the entire device could be constructed of non-metallic materials if desired for long life and low cost.

It is seen that the valve manifold of this invention presents a very compact structure having a minimum number of movable parts and operable on partial rotation to control fluid flow which is desirable in the use of differential pressure measuring devices in fluid conveyance systems. The valve manifold of this invention takes up a minimum amount of space and can be readily connected to a given pressure differential measuring instrument and a pipe line thereby representing minimum installation and investment costs. Additionally the valve manifold of this invention presents a unique compact structure that is simple to operate, economical to manufacture, and substantially maintenance free.

I claim:

1. A valve manifold usable in connection with a fluid conveyance system for regulation of fluid to an instrument such as a differential pressure transmitter, comprising:
   (a) a manifold housing means connectible to the instrument and the fluid conveying system to regulate fluid therebetween,
   (b) said housing means having first and second spaced and substantially parallel passageways therethrough, a third passageway extended transversely of and intersecting said first and second passageways, and a bleed passageway connected to said passageways to allow fluid to pass externally of said housing means,
   (c) a ball valve means rotatably mounted in each of first of said second passageways to control fluid therethrough, and
   (d) means interconnecting both of said ball valve means for rotation from a first closed position to prevent fluid flow through said first and second passageways to a second opened position allowing unrestricted fluid through said first and second passageways.

2. A valve manifold as described in claim 1, including:
   (a) said housing means having an externally opened vent opening intersecting said bleed passageway, and
   (b) a vent valve member mounted in said bleed passageway to selectively control fluid flow from said bleed passageway to said vent opening as said vent valve member is movable between closed and open positions.

3. A valve manifold as described in claim 2, wherein:
   (a) said interconnecting means being a splined linkage stem member mounted in said third passageway to permit fluid flow thereabout to said bleed passageway whereby the same may flow through said vent opening depending on the relative position of said vent valve member.

4. A valve manifold as described in claim 1, wherein:
   (a) said ball valve means including a spherical ball member having a diametrically extending opening therethrough operable to permit fluid flow through said first or second passageways when in the opened position, and
   (b) a by-pass slot extended chordally of said spherical ball member to permit fluid flow into said third passageway only when said ball valve means is in the closed position.

5. A valve manifold as described in claim 4, wherein:
   (a) said ball valve means having a pair of valve seat members engaged with opposite sides of said spherical ball member to control fluid flow within said opening and said by-pass slot depending on the rotational position of said ball valve means relative to said first and second passageways, respectively, and said valve seat members.

6. A valve manifold as described in claim 4, wherein:
   (a) said ball valve means having closure plug members mounted in one end of said first and second passageways, respectively, of a size greater than said ball valve member thereby permitting ready removal of said ball valve member and said valve seat member for repair and maintenance purposes, and
   (b) threaded openings in the other end of said first and second passageways adapted for ready connection to the fluid conveyance system.

7. A valve manifold as described in claim 1, including:
   (a) valve stem means connected in said third passageway connected to one of said ball valve means operable to rotate the interconnected said ball valve means and said interconnecting means to control fluid flow through said housing means.

8. A valve manifolld as described in claim 1, wherein:
   (a) said interconnecting means having a linkage stem member to permit fluid flow thereabout from said first and second passageways to said third passageway and said vent passageway, and
   (b) said linkage stem constructed of a plastic material thereby preventing corrosion and resultant binding of same within said third passageway during usage.

9. A valve manifold as described in claim 1, wherein:
   (a) said interconnecting means having a linkage stem member mounted in said third passageway connected to said ball valve meas, respectively, by a slot and key connector, and
   (b) said slot key connection having relative spacing therein to permit initial rotation of one of said ball valve means relative to the other on movement from said closed position to said opened position.

10. A valve manifold as described in claim 9, wherein:
    (a) said one of said ball valve means connected to the high pressure one of said first and second passageways to cause fluid flow to the low pressure one of said first and second passageways on the initial rotation to equalize pressure on the instrument for accurate measurement.

References Cited

UNITED STATES PATENTS

| 1,270,722 | 6/1918 | Gillette | 137—595 |
| 2,871,881 | 2/1959 | Hewson | 137—595 |
| 3,234,958 | 2/1966 | Butters | 137—595 XR |

HENRY T. KLINKSIEK, *Primary Examiner.*